US012324448B2

(12) United States Patent
Guo et al.

(10) Patent No.: US 12,324,448 B2
(45) Date of Patent: Jun. 10, 2025

(54) TOFU WITH LONG SHELF LIFE AND PREPARATION METHOD THEREOF

(71) Applicant: China Agricultural University, Beijing (CN)

(72) Inventors: Shuntang Guo, Beijing (CN); Xinran Liu, Beijing (CN); Yue Li, Beijing (CN); Jingting Xu, Beijing (CN)

(73) Assignee: China Agricultural University, Beijing (CN)

( * ) Notice: Subject to any disclaimer, the term of this patent is extended or adjusted under 35 U.S.C. 154(b) by 129 days.

(21) Appl. No.: 18/076,994

(22) Filed: Dec. 7, 2022

(65) Prior Publication Data

US 2023/0172239 A1 Jun. 8, 2023

(30) Foreign Application Priority Data

Dec. 8, 2021 (CN) ......................... 202111492576.0

(51) Int. Cl.
*A23L 11/30* (2016.01)
*A23L 11/45* (2021.01)

(52) U.S. Cl.
CPC ............... *A23L 11/35* (2016.08); *A23L 11/45* (2021.01); *A23V 2002/00* (2013.01)

(58) Field of Classification Search
CPC ................................ A23L 11/35; A23L 11/45
See application file for complete search history.

(56) References Cited

FOREIGN PATENT DOCUMENTS

| | | | | |
|---|---|---|---|---|
| CN | 1065384 | A | | 10/1992 |
| CN | 102986913 | A | | 3/2013 |
| CN | 103734865 | A | | 4/2014 |
| CN | 105192091 | A | * | 12/2015 |
| CN | 106070683 | A | | 11/2016 |
| CN | 108576249 | A | | 9/2018 |

OTHER PUBLICATIONS

Cheng et al. CN 106070683 English Translation. (Year: 2016).*
Ju et al. CN 108576249 A Derwent Abstract. (Year: 2018).*
Chang et al. CN 109275725 A Derwent Abstract. (Year: 2019).*
Jin et al. KR 787490 B1 Derwent Abstract. (Year: 2007).*
Mizuno, JP 2020115845, Aug. 6, 2020, Derwent Abstract. (Year: 2020).*
CNIPA, Notification of Second Office Action for CN202111492576.0, Aug. 17, 2023.
China Agricultural University (Applicant), (allowed) replacement claims for CN202111492576.0, Dec. 21, 2023.
CNIPA, Notification to grant patent right for invention in CN202111492576.0, Jan. 4, 2024.

* cited by examiner

*Primary Examiner* — Stephanie A Cox

(57) ABSTRACT

This invention provides a tofu with long shelf life and preparation method thereof, comprising soaking soybean to make soy milk, filtering to remove bean dregs, boiling, primary cooling, homogenizing, deaerating, UHT sterilization, secondary cooling, inline mixing soy milk with sterilized composite coagulant, aseptic filling, microwave heating, solidification, cooling for formation. According to this invention, a composite coagulant is prepared by combining basic salts with coagulant, then, the composite coagulant is inline mixed with soy milk, next, the mixture is intermittently heated by microwave to form tofu. The invention solves the problems existed in the preparation of tofu with long shelf life, including short temporary storage time, easy tube pasting and other issues after the coagulant is mixed with soy milk. This invention has the advantages of causing no corrosion on pipes, and taking less time in the heating and solidification process, etc. The long-shelf-life tofu produced by the invention has a shelf-life of more than 3 months at room temperature, while maintaining the original quality of the tofu, and has better taste and higher elasticity.

4 Claims, No Drawings

TOFU WITH LONG SHELF LIFE AND PREPARATION METHOD THEREOF

TECHNICAL FIELD

The invention belongs to the field of food processing, particularly relates to a tofu with long shelf life and preparation method thereof.

BACKGROUND

The soybean industry is a unique industry that is worth 100 billion yuan in China, however, facing the global upsurge of plant proteins consumption in recent years, the industry is now facing new challenges in aspects of improving product quality and realizing modern manufacturing for its development. Tofu is a traditional soybean food in China, and its production process is divided into two parts: first, soaking and pulping soybeans to form soy milk; next, adding coagulants to cooked soy milk at a suitable temperature, making it coagulate form tofu with or without pressing.

Short shelf life has always been the bottleneck that restricts the modernization of the tofu industry. At present, the shelf life of tofu sold in the market at room temperature is less than one day. Although the present industrial production can apply refrigeration to extend the shelf life of tofu for several days, it requires the processes of transportation, storage and retail all to be tracked by the cold chain, which greatly increases the production cost and hinders the modernization of the tofu industry.

At present, one of the methods to prolong the shelf life of tofu is to add preservatives. For example, in the patent CN 102986913, ethyl hydroxybenzoate is added to the coagulant, but the shelf life of tofu at room temperature can only be extended to 3 days, and the addition of chemical preservatives does not meet consumers' demands for "clean label". Moreover, patent CN 103734865 uses the addition of yellow serofluid to prolong the shelf life of the biological coagulant tofu (sour Tofu) to 11-12 days under 4° C., but this method only limits to sour tofu.

In recent years, the method of sterilizing soy milk to prolong its shelf life has been developed. Patent CN 106070683 mentioned the use of UHT sterilization method to produce "brick tofu", but the dry-hot solidification process of this method lasts about 1 h, which is a relatively longer time in tofu processing, and consumes a lot of energy. Moreover, the high concentration of chloride ions in the coagulant in the actual factory production is easy to corrode the stainless steel pipes required for aseptic filling. Moreover, similar to the existing sterilized tofu products abroad, the tofu prepared by this method still has some disadvantages, including short temporary storage time of coagulants, fast reaction rate after coagulants and soy milk are mixed, easy formation of lumpy aggregates, high risk of paste in pipe, etc., making the produced tofu to have a "noodle-like" mouth feel, and insufficient elasticity.

Therefore, at present, there is still a lack of a production process for tofu with long shelf life suitable for industrial production, and there is also a lack of tofu products with good quality that can be stored at room temperature in markets.

SUMMARY

The purpose of this invention is to provide a tofu with long shelf life and preparation method thereof, comprising the following steps:

soaking and pulping soybeans, adding a defoamer, filtering and removing dregs to obtain soy milk; boiling the soy milk; homogenizing and deaerating the boiled soy milk after primary cooling; sterilizing the homogenized and deaerated soy milk by UHT; mixing the sterilized soy milk with composite coagulant after a second cooling; using intermittent microwave to heat the sterile filled soy milk for solidification, obtaining the tofu with long shelf life.

Further, the pulping conditions are as follows: soybean and water are mixed and ground, wherein the added amount of water is not more than 6 times the dry weight of soybean; specifically, it can be 6 times;

Further, the defoamer is a single defoamer or a compound defoamer selected from monoglyceride, diglycerol stearate, polydimethylsiloxane, emulsified silicone oil and phospholipid; specifically, it can be monoglyceride.

The added amount of the defoamer is combined with the actual production demand and the requirements of different kinds of defoamers, and it is added according to the conventional adding amount.

Further, the bean paste is filtered and deslagging to obtain soy milk, and the solid content of the soy milk is not less than 9% (preferably 9%-11%); specifically, it can be 10.5%;

In the above method, the boiling conditions are as follows: the central temperature of soy milk reaches 95-100° C. under normal pressure, and then it is maintained for 5-10 min; specifically, it can be maintained at 95° C. for 5 min; or 108-115° C. for 5-10 min under slight pressure; specifically it can be 115° C. for 5 min.

Further, in the above method, the primary cooling means that the temperature is cooled to 60-75° C.; specifically, it can be 70° C.

Further, in the above method, the "homogenization, degassing; UHT sterilization; The sterilization step can be carried out according to various conventional methods; specifically, it can be homogenized once under the pressure of 20 MPa; deaerating under vacuum with the vacuum degree of 0.05 MPa; the UHT sterilization temperature is 134° C. with a period of 5 s. For membrane filtration sterilization, using a 10-inch single-core filter, the filter element accuracy is 0.2 μm.

Further, in the above method, the second cooling means that the temperature is cooled to 8-15° C.; Specifically, it can be lat.

Further, the composite coagulant is a mixed aqueous solution of sterilized strong base-weak acid salt and coagulant, and the water temperature of the mixed aqueous solution is 8-15° C.; specifically, 10° C.; to ensure the accurate flow control of the inline mixing pump, it is required that the amount of water solution should not be less than 13% of the soy milk mass when the water solution is mixed with soy milk inline, specifically it can be 13.7%.

In the aqueous solution of the composite coagulant, the additive amount of basic salt is 1.25-2.10% (w/w); specifically, it can be 1.50%, 1.70%; the additive amount of coagulant is 2.35-2.95% (w/w); specifically, the rates can be 2.375%, 2.50%, 2.75%.

The basic salt is at least one of sodium citrate, sodium tripolyphosphate, sodium pyrophosphate and sodium lactate; specifically, it can be sodium citrate.

The coagulant is gluconolactone (GDL) used alone or in combination with salt coagulants (such as $MgCl_2$, $CaSO_4$, etc.) and emulsion coagulants (such as W/O type 818SK emulsion coagulants). Specifically, it can be a single use of gluconolactone (GDL). In order to prevent high-concentration chloride ions from corroding the pipe in long-term use, the additive amount of chloride ions in the coagulant should not exceed 0.26% (w/w) of the mixed coagulant aqueous solution.

The intermittent microwave heating solidification finally increases the central temperature of soy milk from the temperature after the second cooling to 85-92° C. and the temperature should be kept for 5-10 min; specifically, the central temperature of soy milk is raised from the temperature after the second cooling to 90° C., and the temperature is kept for 5 min.

The intermittent microwave heating solidification is carried out at microwave power of 70-350 W, and heating lasts 10-12 min according to the temperature rising mode of first high power and then low power; specifically, it can be 12 min of heating, in which the first 6 min is heated with 350 W microwave per min for 30 s, and the last 6 min is heated with 70 W microwave per min for 30 s, and the rest is stopped for 30 s. The specific heating rate should be determined according to the size of the packing box.

Further, in the above method, the cooling is natural cooling to room temperature.

Tofu with long shelf life made according to the above method also belongs to the protection scope of the present invention.

The application of the combination of the strong base-weak acid salt with gluconolactone (GDL) coagulants, salt coagulants and emulsion coagulants in the production of tofu also belongs to the protection scope of the present invention The invention makes full use of the combination of strong base-weak acid salt and coagulants such as gluconolactone (GDL) to regulate the coagulation rate during the coagulation process of soy milk, reducing the formation of lumpy aggregates, solving the problems existing in the production of tofu with long shelf life, including short temporary storage time and pasting in pipe after the coagulants are mixed with soy milk, and it also solves other problems, such as uneven texture, bad mouth feel of softness and lack of elasticity of tofu with long shelf life.

The present invention makes full use of the intermittent microwave heating mode by regulating the heating rate, solving the problems that the soy milk is easy to be boiling and the tofu structure is easy to be destroyed in the microwave heating process.

The tofu with long shelf life produced by the method of the invention has a shelf life of more than 3 months at room temperature. It improves the present situation of the lack of tofu products with good quality and long shelf life that can be stored at room temperature in our market.

DETAILED DESCRIPTION OF EMBODIMENTS

The present invention will be further explained with reference to the following specific embodiments, but the present invention is not limited to the following embodiment.

Unless otherwise specified, the production processes and experimental methods used in the following embodiments are conventional methods; Unless otherwise specified, the reagents and materials used in the following embodiments can be obtained from commercial sources.

Embodiment 1

The soybeans were soaked completely, and then the soaked soybeans were pulped according to the ratio of soybean to water of 1:6, defoamer (monoglyceride) was added with the ratio of 0.5% of the weight of the dried beans, and the soybean pulp was filtered to remove the dregs, then obtaining soy milk with a solid content of 10.5%. Under the condition of slight pressure, soy milk was heated at 115° C. for 5 min. After boiling, the soy milk was cooled to 70° C., homogenized once under the pressure of 20 MPa, and deaerated under the vacuum of 0.05 MPa. The deaerated soy milk was sterilized by UHT at 134° C. for 5 s. After sterilization, the soy milk was cooled to 10° C. and then mixed with the water solution of composite coagulant sterilized by membrane filtration (10-inch single-core filter, filter element accuracy was 0.2 μm). The water temperature of the solution was 10° C., and the additive amount was 13.7% of the soy milk mass. The water solution of composite coagulant contained 1.7% sodium citrate and 2.5% gluconolactone (GDL). After inline mixing, the aseptic filling was carried out, and the packaging box was a 200 ml aseptic packaging box that could be heated by microwave. After filling the packaging box with the processed soy milk, intermittent microwave heating was carried out on the packaging box under the heating condition of 12 min; wherein, the first 6 min was heated by 350 W microwave per min for 30 s with an intermittent of 30 s; and the last 6 min was heated by 70 W microwave per min for 30 s with an intermittent of 30 s. After the center temperature of soy milk rose to 90° C., the temperature was kept for 5 min, then naturally cooled the processed soy milk to room temperature to obtain that finished tofu with long shelf life.

Embodiment 2

The soybeans were soaked completely, and then the soaked soybeans were pulped according to the ratio of soybean to water of 1:6, defoamer (monoglyceride) was added with the ratio of 0.5% of the weight of the dried beans, and the soybean pulp was filtered to remove the dregs, then obtaining soy milk with a solid content of 10.5%. Under the condition of slight pressure, soy milk was heated at 115° C. for 5 min. After boiling the soy milk, the soy milk was cooled to 70° C., homogenized once under the pressure of 20 MPa, and deaerated under the vacuum of 0.05 MPa. The deaerated soy milk was sterilized by UHT at 134° C. for 5 s. After sterilization, the soy milk was cooled to 10° C., and then it was mixed with the water solution of composite coagulant sterilized by membrane filtration (10-inch single-core filter, filter element accuracy was 0.2 μm). The water temperature of the solution was 10° C., and the additive amount was 13.7% of the soy milk mass. The water solution of composite coagulant contained 1.7% sodium citrate and 2.5% gluconolactone (GDL) and 0.125% $MgCl_2$. After inline mixing, the aseptic filling was carried out, and the packaging box was a 330 ml aseptic packaging box that can be heated by microwave. After filling the packaging box with the processed soy milk, intermittent microwave heating was carried out on the packaging box under the heating condition of 10 min; wherein, the 1-2 min was heated by 350 W microwave per min for 40 s with an intermittent of 20 s; the 3-4 min was heated by 350 W microwave per min for 30 s with an intermittent of 30 s; the 5-6 min was heated by 350 W microwave per min for 20 s with an intermittent of 40 s; the 7-10 min was heated by 70 W microwave per min with an intermittent of 30 s; after the center temperature of soy milk was increased to 90° C., the temperature was kept for 5 min, then the processed soy milk was naturally cooled to room temperature to obtain that finished tofu with long shelf life.

Embodiment 3

The soybeans were soaked completely, and then the soaked soybeans were pulped according to the ratio of soybean to water of 1:6, defoamer (monoglyceride) was added with the ratio of 0.5% of the weight of the dried beans, and the soybean pulp was filtered to remove the dregs, then obtaining soy milk with solid content of 10.5%. Under the condition of slight pressure, soy milk was heated at 115° C. for 5 min. After boiling the soy milk, the soy milk was cooled to 70° C., homogenized once under the pressure of 20 MPa, and deaerated under the vacuum of 0.05 MPa. The deaerated soy milk was sterilized by UHT at 134° C. for 5 s. After sterilization, the soy milk was cooled to 10° C., and then it was mixed with the water solution of composite coagulant sterilized by membrane filtration (10-inch single-core filter, filter element accuracy was 0.2 μm). The water temperature of the solution was 10° C., and the additive amount was 14.5% of the soy milk mass. The water solution of composite coagulant contained 1.5% sodium citrate and 2.75% gluconolactone (GDL). After inline mixing, the aseptic filling was carried out, and the packaging box was a 200 ml aseptic packaging box that can be heated by microwave. After filling the packaging box with the processed soy milk, intermittent microwave heating was carried out on the packaging box under the heating condition of 10 min, wherein, the first 5 min was by 350 W microwave heating per min for 30 s with intermittent of 30 s, the other 5 min was 70 W microwave heating per min for 30 s with intermittent of 30 s, after the center temperature of soy milk was increased to 85° C., the temperature was kept for 10 min, then the processed soy milk was naturally cooled to room temperature to obtain that finished tofu with long shelf life.

Comparative Embodiment 1

In this comparative embodiment, the composite coagulant was not used for inline mixing, and other conditions were the same as those in Embodiment 1.

The soybeans were soaked completely, and then the soaked soybeans were pulped according to the ratio of soybean to water of 1:6, defoamer (monoglyceride) was added with the ratio of 0.5% of the weight of the dried beans, and the soybean pulp was filtered to remove the dregs, then obtaining soy milk with a solid content of 10.5%. Under the condition of slight pressure, soy milk was heated at 115° C. for 5 min. After boiling the soy milk, the soy milk was cooled to 70° C., homogenized once under the pressure of 20 MPa, and deaerated under the vacuum of 0.05 MPa. The deaerated soy milk was sterilized by UHT at 134° C. for 5 s. After sterilization, the soy milk was cooled to 10° C., and then it was mixed with the water solution of composite coagulant sterilized by membrane filtration (10-inch single-core filter, filter element accuracy was 0.2 μm). The water temperature of the solution was 10° C., and the additive amount was 13.7% of the soy milk mass. The water solution of composite coagulant contained 1.7% sodium citrate and 2.5% gluconolactone (GDL) and 0.125% $MgCl_2$. After inline mixing, aseptic filling was carried out, and the packaging box was a 200 ml aseptic packaging box that could be heated by microwave. After filling the packaging box with the processed soy milk, intermittent microwave heating was carried out on the packaging box under the heating condition of 12 min, wherein, the first 6 min are heated by 350 W microwave per min for 30 s, and the second 6 min are heated by 70 W microwave per min for 30 s, and the second 6 min was with an intermittent of 30 s. After the center temperature of soy milk rose to 90° C., the temperature was kept for 5 min, then the processed soy milk was naturally cooled to room temperature to obtain the finished tofu.

Comparative Embodiment 2

In this comparative embodiment, a sterile paper aluminum box and ordinary water bath heating method were used, and other conditions are the same as those in embodiment 1.

The soybeans were soaked completely, and then the soaked soybeans were pulped according to the ratio of soybean to water of 1:6, defoamer (monoglyceride) was added with the ratio of 0.5% of the weight of the dried beans, and the soybean pulp was filtered to remove the dregs, then obtaining soy milk with a solid content of 10.5%, under the condition of slight pressure, soy milk was heated at 115° C. for 5 min. After boiling the soy milk, the soy milk was cooled to 70° C., homogenized once under the pressure of 20 MPa, and deaerated under the vacuum of 0.05 MPa. The deaerated soy milk was sterilized by UHT at 134° C. for 5 s. After sterilization, the soy milk was cooled to 10° C., and then it was mixed with the water solution of composite coagulant sterilized by membrane filtration (10-inch single-core filter, filter element accuracy was 0.2 μm), the water temperature of the solution was 10° C., and the addition amount was 13.7% of the soy milk mass. The composite coagulant water solution contained 1.7% sodium citrate and 2.5% gluconolactone (GDL). After mixing, the aseptic filling was carried out, and the packaging box was a 250 ml aseptic paper aluminum box. After filling the packaging box with the processed soy milk, the package was heated in water bath at 90° C. for 30 min, then the processed soy milk was naturally cooled to obtain the finished tofu.

The texture (hardness, elasticity, chewiness), moisture and water retention of the products obtained in embodiment and Comparative Embodiment 1 and Comparative embodiment 2 and the commercial lactone tofu were measured after cooling at 4° C. overnight, and the average values are shown in Table 1.

Determination Methods of Hardness, Elasticity and Chewiness:

Two compression experiments were carried out with Brookfield texture analyzer CT-3. Tofu was cut into a round cylinder with a diameter of 1 cm and a height of 1 cm. The test probe was an acrylic probe with a flat surface (TA 25/1000 probe with a diameter of 50.8 cm, a length of 20 mm and a weight of 23 g). The target value was 40% of the original height, the trigger point load was 5 g, the test speed was 0.5 mm/s and the return speed was 0.5 mm/s, and circulated twice. Texture Pro CT V1.8 software was used to record the curve of compression process and calculate the hardness, elasticity and chewiness.

Measurement Method of Moisture:

Determination Method of Water Retention:

The water retention of the sample was determined by a centrifugal tube with a sleeve inside. A filter paper was placed with the same size on the bottom of the casing, a certain amount of samples was weighed in the casing, and centrifuged at 1000 g for 10 min, discarded the effluent and weigh. Water retention (WHC) was calculated according to the following formula:

$$WHC(\%) = \left(1 - \frac{M_1 - M_2}{(M_1 - M_0) \times MC}\right) \times 100$$

Wherein:

$M_0$: Total weight of filter paper and casing (g);

$M_1$: Total weight of filter paper, sleeve and sample (g);

$M_2$: Total weight of filter paper, sleeve and sample after centrifugation (g);

MC: moisture content (g/100 g).

TABLE 1

Comparison of quality evaluation of Embodiment 1 with comparative embodiment and commercial lactone tofu

| | Hardness/ g | Elasticity/ mm | Chewi-ness/ mJ | Moisture g/100 g | Water retaining property/% |
|---|---|---|---|---|---|
| Embodiment 1 | 103.80 | 3.15 | 1.47 | 91.60 | 31.22 |
| Embodiment 2 | 105.9 | 2.97 | 1.46 | 91.29 | 33.39 |
| Embodiment 3 | 104.2 | 3.04 | 1.58 | 91.41 | 31.25 |
| Comparative Embodiment 1 | 110.60 | 3.03 | 1.69 | 91.44 | 30.73 |
| Comparative Embodiment 2 | 100.13 | 2.97 | 1.40 | 91.53 | 26.88 |
| Commercial lactone tofu | 94.67 | 2.80 | 1.31 | 91.43 | 36.54 |

There was no significant difference between the quality of Embodiments and Comparative Embodiment 1, but the gel of Comparative Embodiment 1 started earlier and the gelation rate was faster. In the actual production process, the longest temporary storage time of coagulants and soy milk was short, so a faster filling speed was required. Moreover, soy milk in the aseptic tank could be easy to form lumpy aggregates, which could lead to serious consequences if the equipment was shut down. In addition, after a long time of production, there could be pasting in the pipe.

There was no significant difference in the quality between Embodiment 2 and Comparative Embodiment 2. However, in Comparative Embodiment 2, the traditional water bath method was adopted, and the sterile box could be soaked by water, and the interface could be easily damaged, which could affect the product quality.

The total colony count and coliforms of the embodiments stored at room temperature for 25 days, 45 days and 93 days were measured (using the methods in GB 4789.2-2016 and GB 4789.3-2016), and the results are shown in Table 2; Among the results, the texture, moisture and water retention of Embodiment 1 after 25 days, 45 days and 93 days of storage at room temperature were compared, and the average values are shown in Table 3.

TABLE 2

Total number of colonies and coliforms during storage at room temperature (25° C.) of the embodiment 1

| | Total colony count CFU/g | Coliforms MPN/g |
|---|---|---|
| Embodiment 1-25 days | Not detected(<10) | Not detected(<3.0) |
| Embodiment 1-45 days | Not detected(<10) | Not detected(<3.0) |
| Embodiment 1-93 days | Not detected(<10) | Not detected(<3.0) |
| Embodiment 2-25 days | Not detected(<10) | Not detected(<3.0) |
| Embodiment 2-45 days | Not detected(<10) | Not detected(<3.0) |
| Embodiment 2-93 days | Not detected(<10) | Not detected(<3.0) |
| Embodiment 3-25 days | Not detected(<10) | Not detected(<3.0) |
| Embodiment 3-45 days | Not detected(<10) | Not detected(<3.0) |
| Embodiment 3-93 days | Not detected(<10) | Not detected(<3.0) |

TABLE 3

Quality changes of Embodiment 1 during storage a troom temperature (25° C.)

| | Hardness/ g | Elasticity/ mm | Chewi-ness/ mJ | Moisture g/ 100 g | Moisture/ % |
|---|---|---|---|---|---|
| 25 days | 100.23 | 3.35 | 1.49 | 91.32 | 33.57 |
| 45 days | 96.20 | 3.28 | 1.46 | 91.34 | 31.50 |
| 93 days | 93.67 | 3.05 | 1.40 | 91.40 | 32.95 |

The Embodiments had no colony growth after being stored at room temperature for 3 months, and it could be seen from Embodiment 1 that there was no obvious quality change, because the shelf life could reach more than 3 months.

The product obtained in Embodiment 1 was compared with a brand of tofu with long shelf life in Japan, and sensory evaluation was conducted by a two-point test. 20 selected sensory evaluators (average age: 25.3 years old) who had been trained in advance and have professional background knowledge of food, and made a pairwise comparison on whether there were differences in the four sensory characteristics of color, smell, taste and texture and the overall preference degree (choose preferred products), and made a directional pairwise comparison on the three quality problems of “noodle-like” degree, elasticity and astringency of taste (choose products with more obvious corresponding indicators), the results are shown in Table 4.

TABLE 4

Sensory evaluation results of the product obtained in Embodiment 1 and a Japanese brand product

| | Embodiment 1(The number of evaluators) | Japanese brand tofu product(The number of evaluators) | Evaluation results |
|---|---|---|---|
| Color and lustre | 12 | 8 | No difference |
| Scent | 13 | 7 | No difference |
| Taste | 8 | 12 | No difference |
| Texture | 11 | 9 | No difference |
| Overall Preference | 12 | 8 | No difference |
| More chewiness of “noodle-like” | 5 | 15 | Japanese brand tofu product has more “noodle-like” chewiness |
| Higher elasticity | 16 | 4 | Japanese brand tofu product has lower elasticity |
| Astringency | 7 | 13 | No difference |

Compared with comparative embodiment and commercial lactone tofu, it can be found that the long shelf-life tofu produced in Embodiment 1 not only prolonged the quality-keeping period for more than 3 months, but also prolonged the temporary storage time after the coagulant was mixed with soy milk, which solved the problem of easy pasting, reduced the time for heating and solidification, and did not affect the original quality of tofu. In addition, compared with the long shelf-life tofu of the Japanese brand, it was found that the product of Embodiment 1 had better taste and higher elasticity, and other aspects were equivalent to the quality of the products sold in Japan, at the same level.

What is claimed is:

1. A preparation method of a tofu, the preparation method comprising:

soaking and pulping soybeans, adding a defoamer, filtering and removing dregs to obtain soy milk;

boiling the soy milk to obtain boiled soy milk;

performing a primary cooling on the boiled soy milk to obtain primary cooled soy milk with a temperature of 60-75° C.;

homogenizing and deaerating the primary cooled soy milk to obtain homogenized and deaerated soy milk;

sterilizing the homogenized and deaerated soy milk by ultra-high temperature (UHT) to obtain sterilized soy milk;

performing a second cooling on the sterilized soy milk to obtain second cooled soy milk with a temperature of 8-15° C.;

performing inline mixing on the second cooled soy milk and a composite coagulant to obtain a mixture, wherein the composite coagulant is a mixed aqueous solution of sterilized strong base-weak acid salt and coagulant, a weight ratio of the sterilized strong base-weak acid salt to the coagulant is (1.25-2.10):(2.35-2.95), a weight concentration of the sterilized strong base-weak acid salt is 1.25-2.10%, and a weight concentration of the coagulant is 2.35-2.95%; the coagulant is gluconate lactone or a combination of the gluconate lactone and $MgCl_2$, and an additive amount of chloride ions in the coagulant does not exceed 0.26% (w/w) of a mixed coagulant aqueous solution; the sterilized strong base-weak acid salt is sodium pyrophosphate or sodium lactate; and a temperature of the mixed aqueous solution is 8-15° C., and an addition amount of the mixed aqueous solution is not less than 13% of a weight of the soy milk;

filling the mixture into an aseptic packaging box to obtain sterile filled soy milk; and using intermittent microwave to heat the sterile filled soy milk for a period of 10-12 min for solidification, and then cooling to obtain the tofu, wherein in a first half of the period, the sterile filled soy milk is heated with 350 W microwave per minute for 30 seconds, with an interval of 30 seconds, and in a second half of the period, the sterile filled soy milk is heated with 70 W microwave per minute for 30 seconds, with an interval of 30 seconds;

wherein the step of using intermittent microwave to heat the sterile filled soy milk for the period of 10-12 min for solidification, and then cooling to obtain the tofu comprises the following steps, which are implemented in sequence:

using the intermittent microwave to heat the sterile filled soy milk to make a center temperature of the sterile filled soy milk increase to a temperature of 90° C.;

keeping the temperature at 90° C. for 5 min to obtain heated soy milk, and cooling the heated soy milk to a room temperature to thereby obtain the tofu.

2. A preparation method of a tofu, comprising soaking and pulping soybeans, adding a defoamer, filtering and removing dregs to obtain soy milk;

boiling the soy milk to obtain boiled soy milk;

performing a primary cooling on the boiled soy milk to obtain primary cooled soy milk with a temperature of 60-75° C.;

homogenizing and deaerating the primary cooled soy milk to obtain homogenized and deaerated soy milk;

sterilizing the homogenized and deaerated soy milk by ultra-high temperature (UHT) to obtain sterilized soy milk;

performing a second cooling on the sterilized soy milk to obtain second cooled soy milk with a temperature of 8-15° C.;

performing, by using an inline mixing pump, inline mixing on the second cooled soy milk and a composite coagulant to obtain a mixture, wherein the composite coagulant is a mixed aqueous solution of sterilized strong base-weak acid salt and coagulant, a weight ratio of the sterilized strong base-weak acid salt to the coagulant is (1.25-2.10):(2.35-2.95), a weight concentration of the sterilized strong base-weak acid salt is 1.25-2.10%, and a weight concentration of the coagulant is 2.35-2.95%; the coagulant is gluconate lactone or a combination of the gluconate lactone and $MgCl_2$, and an additive amount of chloride ions in the coagulant does not exceed 0.26% (w/w) of a mixed coagulant aqueous solution; the sterilized strong base-weak acid salt is sodium pyrophosphate or sodium lactate; and a temperature of the mixed aqueous solution is 8-15° C., and an addition amount of the mixed aqueous solution is not less than 13% of a weight of the soy milk;

filling the mixture into an aseptic packaging box to obtain sterile filled soy milk; and using intermittent microwave to heat the sterile filled soy milk for a period of 10-12 min for solidification, and then cooling to obtain the tofu, wherein in a first half of the period, the sterile filled soy milk is heated with 350 W microwave per minute for 30 seconds, with an interval of 30 seconds, and in a second half of the period, the sterile filled soy milk is heated with 70 W microwave per minute for 30 seconds, with an interval of 30 seconds.

3. The preparation method of the tofu as claimed in claim 2, wherein the tofu has a shelf life of more than 3 months at a room temperature.

4. A preparation method of a tofu, comprising the following steps:

soaking soybeans to obtain soaked soybeans;

pulping the soaked soybeans according to a ratio of the soybeans to water of 1:6 to obtain soybean pulp;

adding monoglyceride to the soybean pulp, to obtain foam-removed soybean pulp, wherein a weight ratio of the monoglyceride to the soybeans is 0.5%;

filtering the foam-removed soybean pulp to remove dregs in the foam-removed soybean pulp, to thereby obtain soy milk with a solid content of 10.5%;

heating the soy milk at a temperature of 115° C. for 5 min to obtain heated soy milk;

performing a primary cooling on the heated soy milk to obtain primary cooled soy milk with a temperature of 70° C.;

homogenizing and deaerating the primary cooled soy milk under a pressure of 20 MPa and a vacuum of 0.05 MPa, to obtain homogenized and deaerated soy milk;

sterilizing the homogenized and deaerated soy milk by UHT at 134° C. for 5 seconds, to obtain sterilized soy milk;

performing a second cooling on the sterilized soy milk to obtain second cooled soy milk with a temperature of 10° C.;

performing, by using an inline mixing pump, inline mixing on the second cooled soy milk and a composite coagulant sterilized by membrane filtration to obtain a mixture, wherein the composite coagulant is added in a form of an aqueous solution, and a water temperature of the aqueous solution is 10° C., an addition amount of the aqueous solution of the composite coagulant is 13.7% of a weight of the soy milk, and the aqueous solution of the composite coagulant contains 1.7% sodium citrate and 2.5% gluconolactone;

filling the mixture into an aseptic packaging box to obtain sterile filled soy milk; and using intermittent microwave to heat the sterile filled soy milk for a period of 12 min for solidification, and then cooling to obtain the tofu, wherein in a first 6 min, the sterile filled soy milk is heated with 350 W microwave per minute for 30 seconds, with an interval of 30 seconds, and in a second 6 min, the sterile filled soy milk is heated with 70 W microwave per minute for 30 seconds, with an interval of 30 seconds;

wherein the step of using intermittent microwave to heat the sterile filled soy milk for the period of 12 min for solidification, and then cooling to obtain the tofu comprises the following steps, which are implemented in sequence:

using the intermittent microwave to heat the sterile filled soy milk to make a center temperature of the sterile filled soy milk increase to a temperature of 90° C.;

keeping the temperature at 90° C. for 5 min to obtain heated soy milk, and cooling the heated soy milk to a room temperature to thereby obtain the tofu.

* * * * *